INVENTOR.
CHARLES A. BUCHER, JR.
BY Alden D. Redfield
Irwin P. Garfinkle
ATTORNEYS.

INVENTOR.
CHARLES A. BUCHER, JR.
BY Alden D. Redfield
Irwin P. Garfinkle
ATTORNEYS.

Sept. 6, 1966 C. A. BUCHER, JR 3,271,682

DOPPLER-SHIFT CORRECTOR FOR SINGLE SIDEBAND COMMUNICATIONS SYSTEMS

Filed Feb. 3, 1964 4 Sheets-Sheet 3

INVENTOR.
CHARLES A. BUCHER, JR.
BY Alden D. Redfield
Kevin P. Garfinkle
ATTORNEYS.

Sept. 6, 1966 C. A. BUCHER, JR 3,271,682
DOPPLER-SHIFT CORRECTOR FOR SINGLE SIDEBAND COMMUNICATIONS SYSTEMS
Filed Feb. 3, 1964 4 Sheets-Sheet 4

INVENTOR.
CHARLES A. BUCHER, JR.
BY Alden D. Redfield
Irwin P. Garfinkle
ATTORNEYS.

United States Patent Office 3,271,682

Patented Sept. 6, 1966

3,271,682

DOPPLER-SHIFT CORRECTOR FOR SINGLE SIDE-BAND COMMUNICATIONS SYSTEMS

Charles A. Bucher, Jr., Cincinnati, Ohio, assignor to Avco Corporation, Cincinnati, Ohio, a corporation of Delaware Filed Feb. 3, 1964, Ser. No. 342,170
5 Claims. (Cl. 325—65)

This invention relates to a system for automatic frequency correction for Doppler shift, and more particularly to a single sideband communications system in which the data for controlling receiver frequency is transmitted within the normal intelligence spectrum.

The use of HF and VHF communications techniques in aircraft which travel faster than the speed of sound requires methods for correction of Doppler shifts. This invention provides Doppler-shift corrections in a simple and practical manner without the complexities or the other disadvantages encountered in prior art systems. For use with a single sideband communications system, the Doppler-correction system must conform to certain established parameters, including:

(1) Automatic Doppler-shift correction circuits which introduce minimum changes in the existing equipment.

(2) Capability for automatically correcting for the maximum expected Doppler shifts. In a practical case where communication is maintained between two aircraft flying at 2 Mach and operating at 30 mc., a Doppler shift of $\pm 120$ cycles can be expected.

(3) Maintenance of the allotted audio bandwidth (approximately 3 kc.) for compatibility with existing equipment.

(4) No significant increase in the consumption of transmit power to accommodate the Doppler-shift correction.

(5) No increase in adjacent channel interference or cross-modulation effects due to the addition of a Doppler corrector.

This invention provides a Doppler-correction system within the bounds of the foregoing parameters by inserting usable control information into the transmitted speech spectrum for comparison with a known function present at the receiver for use as correction criteria. The control information introduced into the speech spectrum takes the form of an audio reference tone, which provides synchronous communications with much the same characteristics as a single sideband system. If the audio tone is injected into the speech without any special precaution, intermodulation effects result and signal detectibility at the receiver is reduced. To overcome this, a portion of the speech spectrum is rejected where redundant information is present, and the audio tone is inserted into this spectrum.

The rejected area of the audio spectrum is chosen with discretion to avoid losing quality and intelligibility. Investigations indicate that various regions of the speech spectrum can be rejected if chosen outside the formant frequency ranges. These formant ranges are located in narrow regions around 300, 500, 1500, 2200, 2700, cycles/second. Therefore, a band of frequencies around 1000 or 2000 cycles/second, for example, can be rejected with minimum degradation in the speech information.

A broad object of this invention is to control the operation of an electronics system with control data inserted into the intelligence channel without substantial increase in power requirement and with no increase in bandwidth.

Another object of this invention is to provide a Doppler-shift correction for a communications system by inserting control information into a rejected redundant portion of the intelligence channel.

Still another object of this invention is to provide a single sideband audio communications system in which a portion of the audio spectrum is rejected from the transmission, and a control tone is inserted into the rejected band for supplying control data for Doppler-shift correction at the receiver.

Another object of this invention is to provide an intelligence communications system in which a portion of the intelligence spectrum is rejected from the transmission, and in which a control signal at the rejected spectrum frequency is inserted for controlling the frequency of operation of the receiver.

For further objects and for a more detailed understanding of the nature of this invention, reference should now be made to the following specification and to the accompanying drawings in which.

Figure 1:
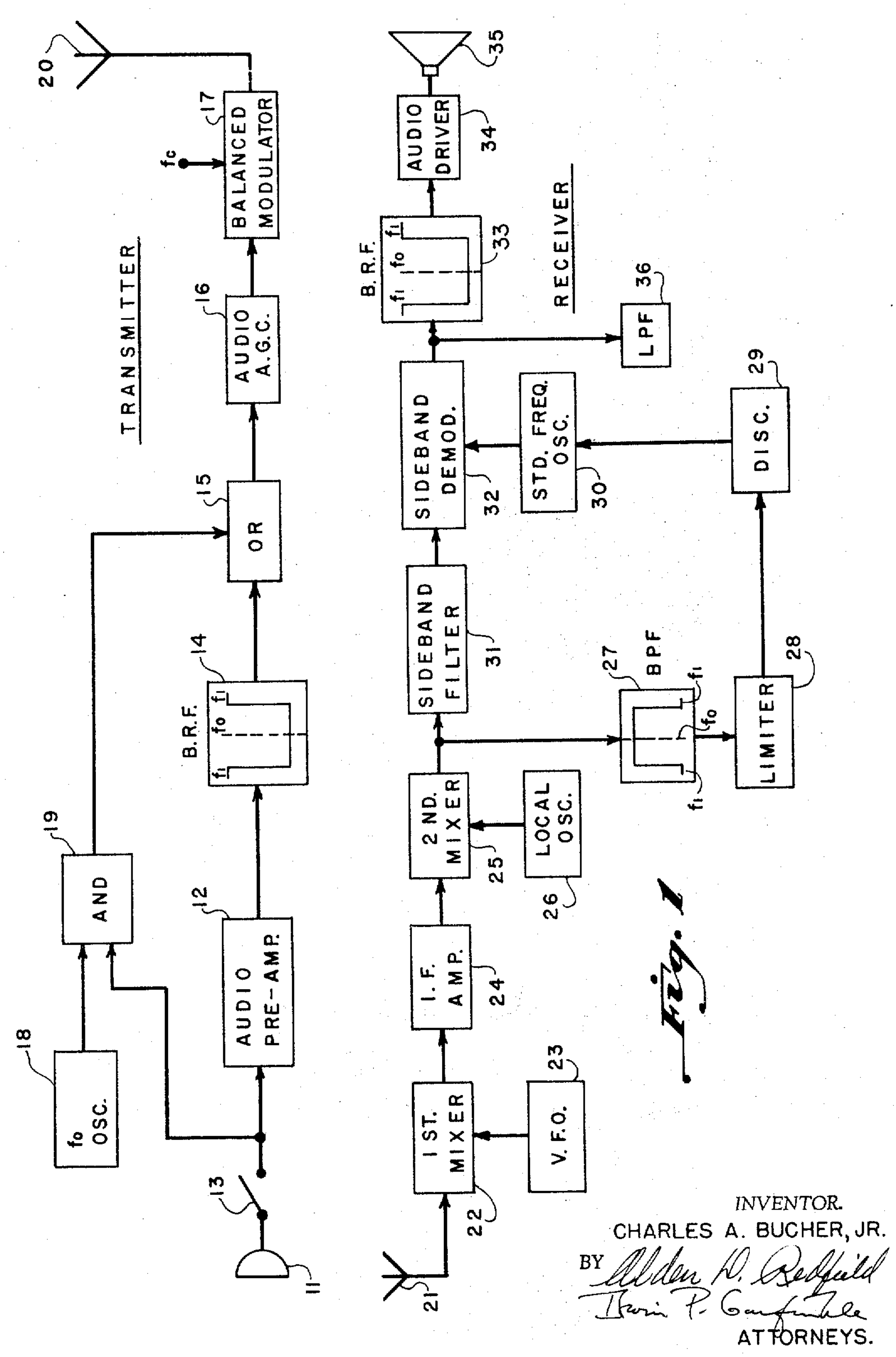
FIGURE 1 is a block diagram of a typical embodiment of this invention.

Referring to FIGURE 1, the system includes a transmitter including a microphone 11 connected to an audio pre-amplifier 12 through a push-to-talk switch 13. The output of the pre-amplifier 12 is then applied through a band-reject filter 14 to one input of an INCLUSIVE OR gate 15. An INCLUSIVE OR gate is one which will permit the passage of either or both of two signals applied to it. The band-reject filter 14 is tuned to a rejection center frequency $f_0$ within the audio range, and has a band-rejection spectrum $f_0 \pm f_1$ equal to at least twice the expected maximum shift of that frequency due to Doppler effect but amounting to only a small percentage of the audio band. The output of the OR gate 15, containing the entire audio spectrum, except the frequencies within the rejected band, is applied in a conventional manner to a gain-controlled audio amplifier 16 and a balanced modulator 17 where the audio modulates a carrier at a frequency $f_c$.

An audio reference tone at frequency $f_0$, to be used ultimately for controlling the frequency of operation of a single sideband receiver nominally tuned to frequency $f_c$, is developed in an oscillator 18 and applied to one input of an AND gate 19. When the push-to-talk switch 13 is closed, audio from the microphone 11 is supplied to the other input of the AND gate 19 to open the gate and develop a tone output at frequency $f_0$ for application to the other input of OR gate 15.

Thus OR gate 15 is supplied with the entire spectrum of audio signal minus the rejected band, plus the audio tone at frequency $f_0$. In this manner, the carrier frequency $f_c$ is modulated by the audio frequency and simultaneously by an audio tone in a rejected band of the audio spectrum. Both signals are then further processed in a conventional manner (not shown) to reject one of the sidebands and suppress the carrier prior to transmission from an antenna 20.

The receiver of the system is of the superheterodyne type. Radio frequency signals received at an antenna 21 are heterodyned in a first mixer 22 with the output of a variable frequency oscillator 23 to produce a first intermediate frequency. After amplification in an amplifier 24, the first intermediate frequency is again mixed in a second mixer 25 with the output of a local oscillator 26 to produce a second intermediate frequency. All this is conventional.

The audio reference tone is derived by means of a band-pass filter 27 from the output of the second mixer 25 and is then applied through a limiter 28 to a discriminator 29 tuned to the reference tone frequency $f_0$. The discriminator 29 serves to reduce the applied signal from the second mixer 25 to a direct voltage proportional to the deviation in frequency, resulting from Doppler effect, of the received tone from the reference frequency $f_0$. The direct voltage output from the discriminator 29 is then applied to the control circuits of a standard frequency oscillator 30, the output of which varies in frequency from a standard frequency by an amount proportional to the direct voltage output of the discriminator. The oscillator 30 provides the conventional local carrier frequency for the single sideband receiver.

The output of the second mixer 25 is also applied through a sideband filter 31 to a sideband demodulator 32, to which the local carrier frequency $f_c$ is applied in accordance with conventional single sideband practice. The output of demodulator 32 consists of an audio signal and several R.F. outputs. The lower sideband is filtered out through a low-pass filter 36, while the desired audio signal is derived through a band-reject filter 33, the rejected band being equal to $f_0 \pm f_1$. The audio output of filter 33 is then applied to an audio driver 34 and a speaker 35 or other transducer.

In operation, transmission of speech is initiated when the push-to-talk switch 13 is closed, opening the AND gate 19 and admitting the output from the oscillator 18 at frequency $f_0$ to the OR gate 15. An expected amount of dead time from the moment the push-to-talk switch 13 is closed until speech information starts (normal human reaction time), enables synchronization to take place between the receiver and the antenna prior to speech transmission. To insure such synchronization prior to speech transmission, the push-to-talk switch 13 may be provided with momentary delay means in connecting the microphone 11 to the pre-amplifier 12. After the short delay period, the speech and the reference tone are applied simultaneously to the OR gate for further signal processing and transmission. To eliminate any possibility of the receiver locking onto the transmitted speech rather than the reference tone $f_0$, the band-rejection filter is provided with a bandwidth equal to twice the maximum anticipated Doppler shift.

In the receiver, the reference tone is extracted by means of the band-pass filter 27 and, after limiting, is applied to the discriminator 29 to produce a direct current control signal for varying the output frequency of the standard frequency oscillator 30 by an amount proportional to the Dopler shift of the received reference tone. Since the shift in frequency of the received reference tone is proportional to the shift in frequency of the transmitted sideband, the output from the standard frequency oscillator 30, properly adjusted, will follow the Doppler shift to provide the required relationship between the sideband and the local carrier frequency. The received reference tone is rejected by the band-reject filter 33 before reaching the audio drive 34, and is therefore eliminated from the intelligence output of the speaker 35.

As noted, the band-reject filter 14 in the transmitter, and the band-pass filter 27 and the band-reject filter 33 in the receiver require a bandwidth with sharp selectivity equal to at least twice the bandwidth of the maximum expected Doppler shift. This system will therefore suffer at ultra high frequencies since the Doppler shift of a reference tone would require the rejection of a band in the speech spectrum having a width sufficient to materially deteriorate the intelligence. In so far as speech transmission is concerned, the embodiment of FIGURE 1 will be limited to communication systems operating at relatively low frequencies or under circumstances where the maximum Doppler shift encountered will not require a rejection bandwith large enough to unacceptably degrade quality and intelligibility.

Figure 2:
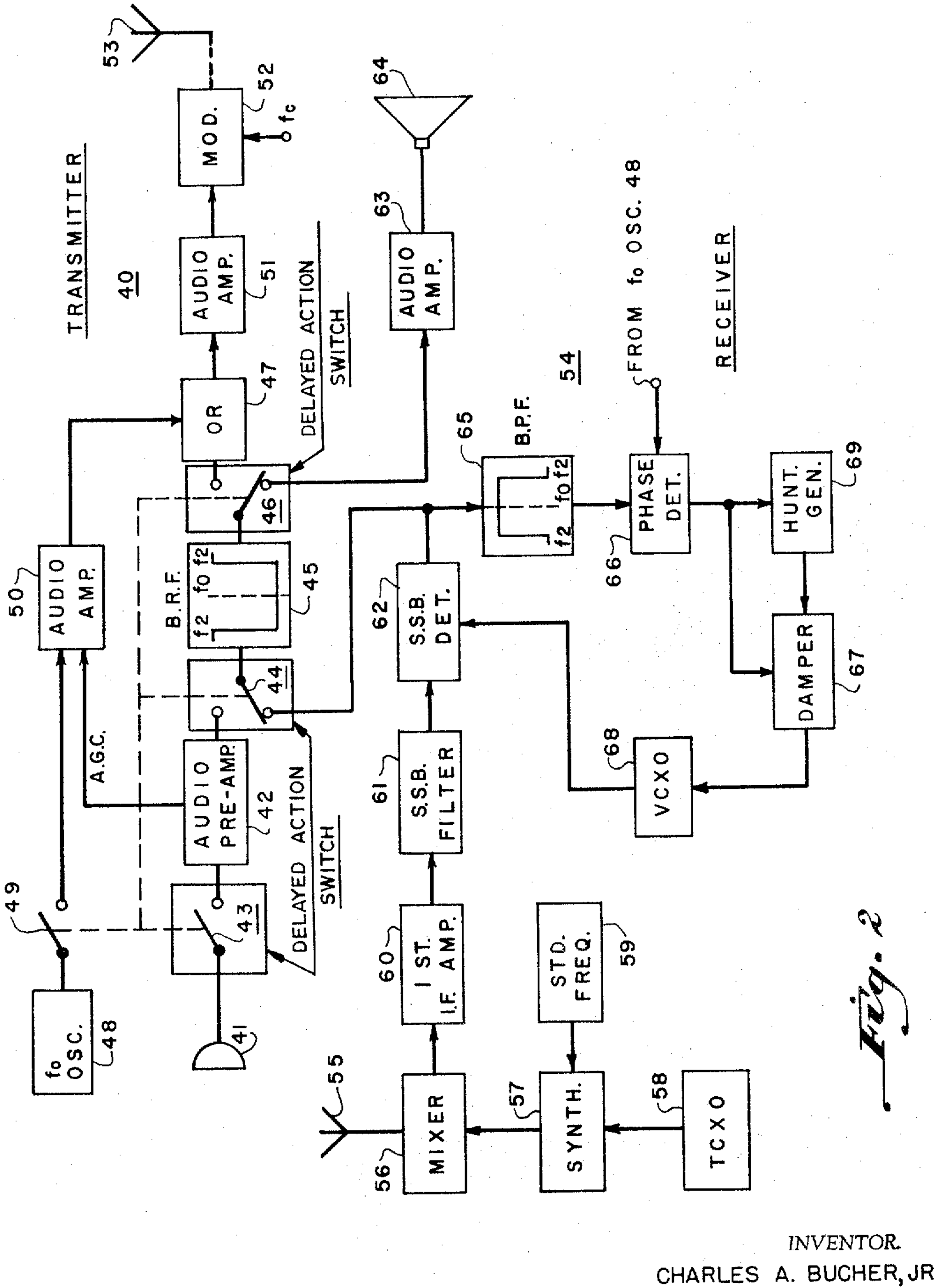
FIGURE 2 is a block diagram of another embodiment of this invention incorporating means for narrowing the rejected band of the intelligence signals.

The embodiment of FIGURE 2 overcomes the deficiency of the system shown in FIGURE 1 and, in addition, illustrates a practical system in which certain elements are common to both the receiver and the transmitter.

The transmitter portion includes a microphone 41 connected to an audio pre-amplifier 42 through a push-to-talk switch 43. The output from the audio pre-amplifier is then applied through switch 44 to a narrow band-reject filter 45 tuned to a center frequency $f_0$ within the audio range and having a band-rejection spectrum $f_0 \pm f_2$. It will be seen that $f_2$ need not be equal to the expected maximum shift of frequency $f_0$ due to Doppler effect, but may be much less than the expected shift. The output from the band-reject filter 45, containing all of the audio signal except for the very narrow rejected spectrum, is applied through a switch 46 to an INCLUSIVE OR gate 47.

Oscillator 48 generates the reference tone at frequency $f_0$, which is also applied to the OR gate 47 through a switch 49 and an audio amplifier 50. A source of automatic gain control derived from the audio pre-amplifier 42 is applied to the audio amplifier 50. The switches 43, 44, 46, and 49 are ganged so that they are simultaneously closed with the exception of switch 49, which closes a short time ahead of the remaining switches, when the push-to-talk switch is depressed. This slight delay of the closing of the switches 43, 44, and 46 permits the transmission of the reference tone ahead of the audio intelligence signal to permit locking in of the receiver prior to receipt of the intelligence signal.

The output from the OR gate, ultimately containing both the reference tone $f_0$ and the audio output from the band-reject filter, is applied to an audio amplifier 51, the output of which is used to modulate the carrier frequency $f_c$ in a modulator 52. After further conventional signal processing (not shown), the modulated carrier is applied to an antenna 53 for transmission.

As noted, the receiver portion of the system is synchronized during the time interval after the closing of the switch 49 and prior to the closing of the switch 43. When the switch 43 closes, the developed output from the audio pre-amplifier 42 provides a source of automatic gain control for the audio amplifier 50 to reduce its gain. Thus, the receiver will be locked in frequency to the transmitter by a strong reference tone, but once intelligence signal is transmitted, the possibility of cross-modulation is reduced by gain reduction of the tone.

The receiver portion of the system includes an antenna 55 which supplies a mixer 56 with signal. The mixer 56 is also supplied with the output from a synthesizer 57 controlled in a conventional manner by the outputs of a temperature-controlled crystal oscillator 58 and a variable standard frequency generator 59. The output from the mixer 56 is then applied in a conventional manner through a first-stage intermediate frequency amplifier 60 and a single sideband filter 61 to one input of a single sideband detector 62, the other input of which is supplied with the output from a voltage-controlled crystal oscillator 68. But for Doppler shift, the oscillator 68 would generate a fixed intermediate frequency for detecting the single sideband signal. To correct for Doppler shift, and to maintain the proper relationship between the transmitted sideband and the local carrier, this invention provides a control for oscillator 68. The output from the single sideband detector 62 is applied to the audio amplifier 63 through the band-reject filter 45, which is common to both the transmitter and receiver, but which is switched between the units by means of the switches 44 and 46. The output from the audio amplifier 63 drives a suitable transducer, such as a speaker 64. Since the band-reject filter 45 serves to reject the received reference tone, only intelligence signal is applied to the audio amplifier 63.

Band-pass filter 65, having a pass band centered at $f_0$ and equal to $2f_2$, applies the rejected tone to one output of a phase detector 66, while the other input of the phase detector is supplied from the $f_0$ oscillator 48. Any difference in frequency between the signal applied from the band-pass filter 65 and $f_0$ results from Doppler shift, and such difference will be represented at the output of the phase detector as a beat frequency equal to the frequency difference superimposed on a direct voltage representing phase shift. The output from the phase detector 66 is applied through a damper network 67 to the voltage-controlled crystal oscillator 68. The damper per se forms no part of this invention. However, for a description of the damper circuit, reference is made to the copending application of Lamplot, Serial No. 106,-750, filed May 1, 1961, now Patent No. 3,158,820, and assigned to the assignee of this invention.

The object of the FIGURE 2 embodiment is to narrow the band-reject spectrum so that substantially the entire audio spectrum can be devoted to intelligence signal. Since the spectrum of the band-reject filter 45 and the band-pass filter 65 is very narrow, no tone signal is applied to the phase detector 66 until the error due to Doppler shift is within that very narrow spectrum. In a practical case this may amount to 50 cycles or less. Furthermore, the tone applied to the detector from the oscillator 48 is a very low voltage, and hence essentially no voltage output is derived from the phase-detector output. Therefore, the system thus far described includes no means for making a correction when the Doppler shift is outside the spectrum of the rejected band. To overcome this, a hunt generator 69 is provided for sweeping the oscillator 68 into the range where a detector output is produced.

The hunt generator 69 produces a sawtooth voltage output which is continuously applied through the damper 67 to the voltage-controlled crystal oscillator 68 except when an output is developed from the phase detector 66. As will be seen from the circuitry of FIGURE 3, the voltage output from the phase detector 66 serves to shut off the hunt generator 69, when the output from the voltage-controlled crystal oscillator has been corrected to reduce the Doppler shift error to within the range of the band-pass filter 65.

Figure 3:
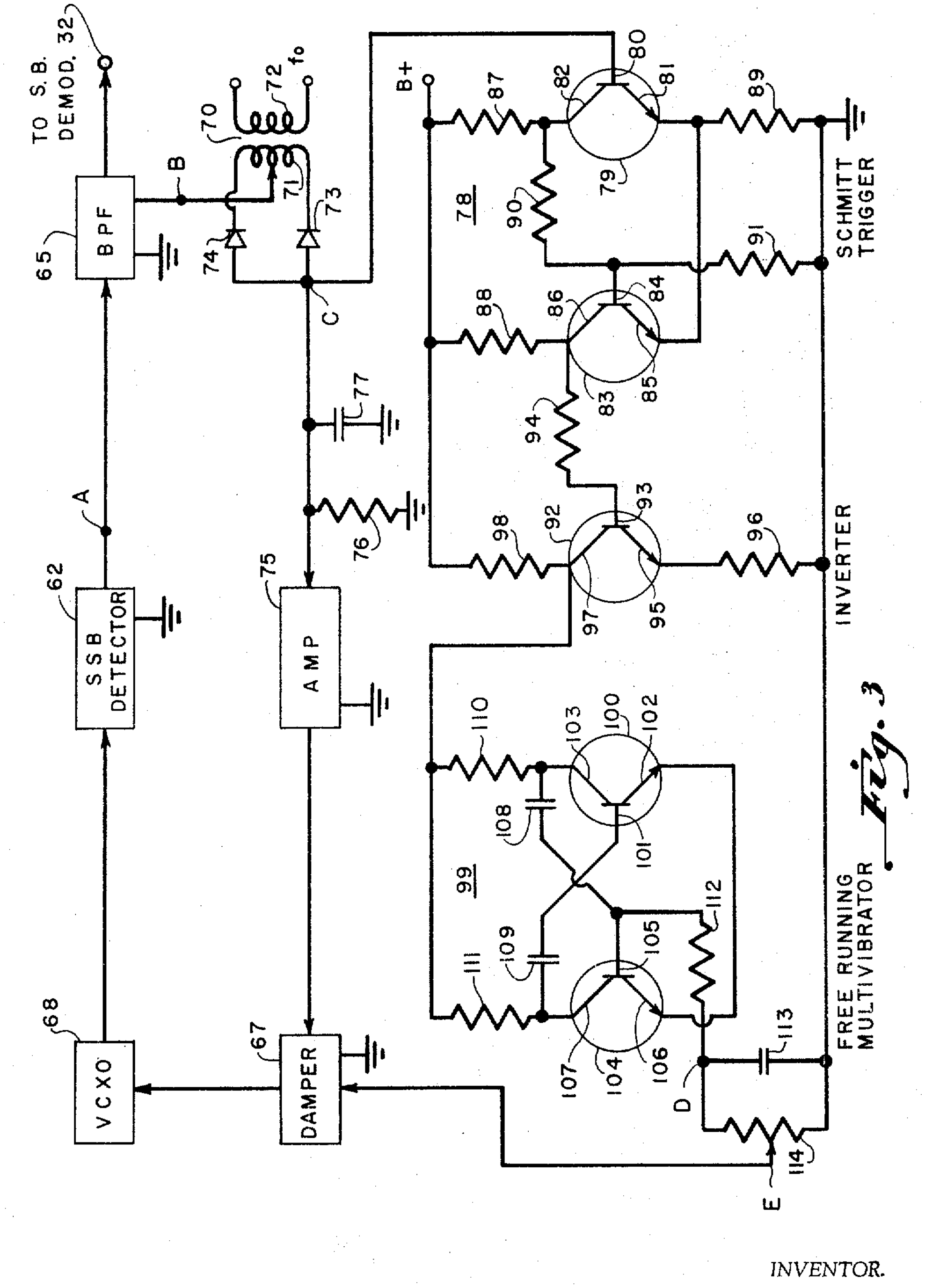
FIGURE 3 shows certain of the circuitry incorporated in the embodiment of FIGURE 2.

In FIGURE 3 the phase detector 66 is shown as including a transformer 70 having a primary winding 71 supplied with the low voltage reference tone from the oscillator 48, and a secondary winding 72 supplied at its center point with received tone from the band-pass filter 65. The band-pass filter 65 is tuned to the reference tone frequency $f_0$, but is provided with a very narrow bandwidth to accommodate only a portion of the expected shift of the received tone due to Doppler. The voltages developed in the secondary winding 72 are rectified by diodes 73 and 74, and the developed voltage, applied through a loop-gain amplifier 75 and damper 67, control the frequency of operation of the crystal oscillator 68. Parallel resistor 76 and capacitor 77 provide a low-pass filter.

The direct voltage output from the detector 66 also drives a Schmitt trigger 78, including a first transistor 79 having a base 80, an emitter 81, and a collector 82, and a second transistor 83, having a base 84, and emitter 85, and a collector 86. The transistors are biased by means of connections to a B+ supply through load resistors 87 and 88, respectively, the emitters 81 and 85 being interconnected and connected to ground through a common emitter-resistor 89. The output from the detector 66 is connected directly to the base 80 of transistor 79, while the voltage developed at the collector 82 is applied to the base 84 of transistor 83 through a voltage divider comprising resistors 90 and 91.

The output of the Schmitt trigger is inverted by means of a transistor 92 having a base 93 connected to the collector of transistor 83 by means of a resistor 94, an emitter 95 connected to ground through a resistor 96, and a collector 97 connected to the B+ supply through a load resistor 98. The voltage developed at collector 97 of transistor 92 provides the operating B+ supply for a free-running multivibrator 99.

The multivibrator 99 is conventional and comprises a transistor 100 having a base 101, an emitter 102, and a collector 103, and a transistor 104 having a base 105, an emitter 106, and a collector 107. The emitters 102 and 106 are connected to ground while the collectors and bases of the transistors 100 and 104 are cross-coupled by means of capacitors 108 and 109, respectively. The collectors 103 and 107 are biased by a connection to the collector 97 of transistor 92 through resistors 100 and 111, respectively.

The square wave output developed in the free-running multivibrator 99 is derived from the base 105 and shaped into a sawtooth by means of a shaping circuit including resistor 112 and capacitor 113. The sawtooth voltage developed across the capacitor 113 is applied by means of a potentiometer 114 to the damper 67 for application to the voltage-controlled crystal oscillator 68. The multivibrator and the shaping circuit together comprise the hunt generator 69.

In operation, in the absence of a received tone within the spectrum of band-pass filter 65, only a very small direct voltage due to the rectification of the reference tone is applied to the base 80 of transistor 79. This small voltage is adjusted so that it is insufficient to render transistor 79 conductive. Under these circumstances, transistor 79 is cut off, and transistor 83 conducts heavily, maintaining a low voltage at the base 93 of the inverter-transistor 92, thereby elevating the voltage at collector 95. Since the collectors of transistors 100 and 104 of the free-running multivibrator 99 are biased by the voltages on collector 97, the multivibrator runs and produces a square wave output which is shaped into a sawtooth wave in the shaping circuit 11, 113. The sawtooth voltage is applied to the voltage-controlled crystal oscillator 68 and sweeps the frequency output of the oscillator 68.

If a tone is present, then at the instant the voltage-controlled crystal oscillator 68 generates a frequency which, when applied to the detector 62, produces a tone within the spectrum of band-pass filter 65, a direct voltage output with a superimposed beat frequency is produced from the detector 66 and applied to the base 80 of transistor 79. This causes the Schmitt trigger 78 to change state, which in turn causes the transistor 92 to conduct heavily, thereby reducing the biasing potential at collector 97 for the free-running multivibrator 99 and cutting it off. At this point the output from the detector provides all the control for the oscillator 68 and locks it in at the proper frequency relationship.

Figure 4:
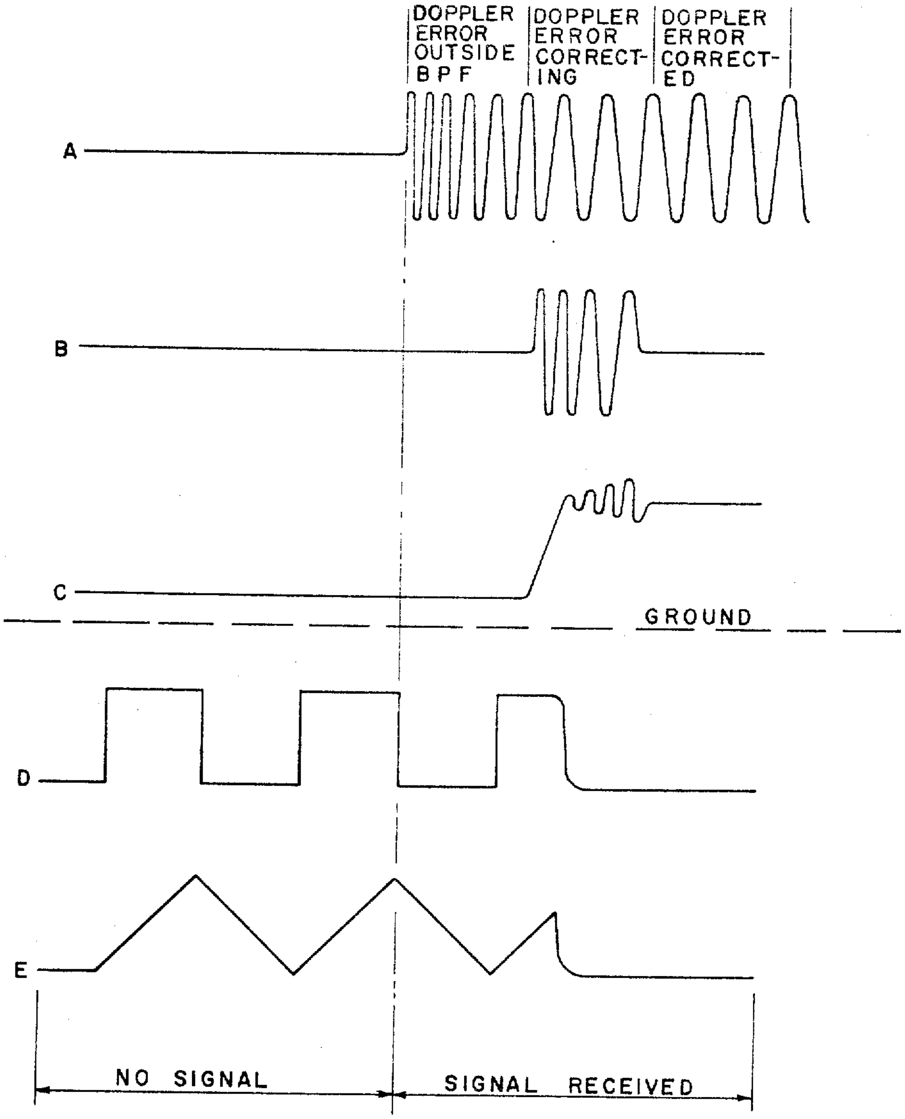
FIGURE 4 is a series of curves demonstrating the operation of the embodiment of FIGURES 2 and 3.

The wave forms developed in the various portions of the circuit under the condition of no tone received and under the condition of a received tone are illustrated in FIGURE 4, the letters "A" through "E" indicating the position in FIGURE 3 at which the wave forms may be observed. In the absence of received signal, the output of the single sideband detector 62 (at point "A") and the output of the band-pass filter 65 (at point "B") are at ground potential. The output of the detector (at point "C") shown a small D.C. potential above ground due to detection of the reference oscillator output. The output of the multivibrator (at point "D") is a square wave, and the output from the shaping circuit (at point "E") is a sawtooth.

When a signal is received, the received tone output is a sine wave at the reference tone frequency plus or minus the shift due to Doppler. In the assumed conditions of FIGURE 4, the received tone is initially shifted outside the spectrum of band-pass filter 65, and hence the output from the filter is zero until the tone output frequency from the detector is driven into range under the influence of the sawtooth voltage (at point "E"). When in range, the output from the detector (at point "C") increases from a small D.C. value to a larger D.C. upon which the beat frequency is superimposed until the beat is eliminated. At this time the developed D.C. voltage, representing the phase relationship of the adjusted received tone and reference tone, locks the oscillator 68 at the proper frequency. After receipt of a signal, the total time required for locking the oscillator 68 comprises at most a single cycle of the multivibrator 99 plus a similarly short period for driving the oscillator 68 with the detector output. In the illustrated example, the phase relationships were such that the detector output cut off the multivibrator action in less than one-half cycle. This means that the time delay incorporated in the push-to-talk switch of the transmitter, for delaying intelligence transmission until frequency lock, need be very short, and generally much less than the reaction time consumed before an operator would actually begin speech.

It will be understood that while only one transmitter-receiver has been shown in each of FIGURES 1 and 2, identical, or compatible, remotely located equipment is required for a complete communications link. Furthermore, while FIGURE 1 illustrates a system in which the receiver-transmitter units are independent, certain of the components may be common to both equipments as in FIGURE 2, and conversely, the receiver-transmitter sections of FIGURE 2 may be made entirely independent. Moreover, while the specification is drawn to single sideband equipment, the invention is not so limited, but may be applied to any type of equipment, e.g., radar, infrared systems, etc., where Doppler shift may require correction. The system may also be used for other than Doppler correction since it may be used to transmit a signal within a redundant intelligence spectrum for any control purpose. Other modifications and adaptations will also be apparent to persons skilled in the art, and it is intended therefore that the invention be limited only by the scope of the appended claims.

I claim:

1. In a transmitter-receiver communications system, the combination comprising:

a source of signal intelligence having a given frequency spectrum;

means for rejecting a single redundant portion of the frequency spectrum of said signal intelligence;

a single source of reference signal having a frequency substantially at the center of the rejected single redundant portion of said frequency spectrum;

a carrier;

means for modulating said carrier with said reference signal and the non-rejected frequency spectrum of said signal intelligence;

means for transmitting at least one sideband of said modulated carrier;

a receiver for receiving said transmitted sideband, said receiver including demodulator means for demodulating said transmitted sideband, said demodulator means including a controllable oscillator;

means for detecting said reference signal;

reference frequency comparison means pre-established at said receiver, said reference frequency comparison means having an operating frequency which is the same as the frequency of said source of reference signal at the transmitter;

means for developing a control signal responsive to the difference in frequency between said detected reference signal and the operating frequency of said reference comparison means; and means responsive to said control signal for controlling the frequency of operation of said oscillator.

2. The invention as defined in claim 1 wherein said means for developing a control signal comprises a frequency discriminator tuned to the frequency of said source of reference signal.

3. The invention as defined in claim 1 wherein said reference comparison means pre-established at said receiver comprises a second source of reference signals, said second source having an operating frequency which is the same as the frequency of said single source of reference signal at the transmitter;

and wherein said means for developing a control signal comprises a phase detector having first and second inputs, said detected reference signal being applied to one of said inputs and said second reference signal being applied to the other input, said phase detector having an output which is a function of the difference in frequency between the frequencies applied at said first and second inputs, said output constituting said control voltage.

4. The invention as defined in claim 3 wherein said mean for rejecting said single redundant portion of the frequency spectrum of said signal intelligence comprises a band rejection filter having a center frequency equal to the frequency of said single source and having a bandwidth equal to only a fraction of the expected shift of the detected reference signal due to Doppler effect;

and wherein said means for detecting the received reference signal includes a band-pass filter having the same center frequency and bandwidth as said band rejection filter;

and a hunt generator for generating a sawtooth wave for continuously adjusting said controllable oscillator in the absence of a detected reference signal within the pass band of said band-pass filter;

and means responsive to a detected reference signal within said pass band for disabling said hunt generator, whereby said hunt generator controls the frequency of operation of said controllable oscillator until the detected reference signal is within said pass band and the output from said detector thereafter controls said frequency of operation.

5. The invention as defined in claim 4, and means for delaying the modulation of said carrier with said non-rejected frequency spectrum of said signal intelligence for a period of time permitting said control signal to control the frequency of operation of said oscillator prior to transmission of said intelligence signal.

References Cited by the Examiner

UNITED STATES PATENTS

| | | | |
|---|---|---|---|
| 1,844,973 | 2/1932 | Ports | 352—49 |
| 2,065,826 | 12/1936 | Roosenstein et al. | 325—62 |
| 2,871,295 | 1/1959 | Stochiewicz | 325—49 |
| 2,958,768 | 11/1960 | Brauer | 325—17 |
| 3,068,416 | 12/1962 | Meyer | 325—50 X |
| 3,084,328 | 4/1963 | Groeneveld et al. | 325—50 X |
| 3,201,692 | 8/1965 | Sichak et al. | 325—17 |
| 3,217,255 | 11/1965 | Broadhead et al. | 325—155 |

DAVID G. REDINBAUGH, *Primary Examiner.*

JOHN W. CALDWELL, *Examiner.*